United States Patent
Chandrasekar et al.

(10) Patent No.: US 8,326,630 B2
(45) Date of Patent: Dec. 4, 2012

(54) CONTEXT BASED ONLINE ADVERTISING

(75) Inventors: Raman Chandrasekar, Seattle, WA (US); Tian Bai, Beijing (CN); Eric J. Chang, Beijing (CN); Michael Tsang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 12/193,657

(22) Filed: Aug. 18, 2008

(65) Prior Publication Data

US 2010/0042403 A1 Feb. 18, 2010

(51) Int. Cl.
*G06F 17/27* (2006.01)
*G10L 13/06* (2006.01)

(52) U.S. Cl. ............... 704/270; 704/9; 704/270.1
(58) Field of Classification Search .............. 704/9, 270, 704/270.1
See application file for complete search history.

(56) References Cited

U.S. PATENT DOCUMENTS

| | | | |
|---|---|---|---|
| 5,923,736 A * | 7/1999 | Shachar ................ | 379/93.17 |
| 6,036,601 A * | 3/2000 | Heckel ................. | 463/42 |
| 6,134,532 A | 10/2000 | Lazarus et al. | |
| 6,332,127 B1 | 12/2001 | Bandera et al. | |
| 6,434,530 B1 * | 8/2002 | Sloane et al. ........... | 705/26.62 |
| 6,957,393 B2 * | 10/2005 | Fano et al. ............. | 715/747 |
| 7,073,129 B1 | 7/2006 | Robarts et al. | |
| 7,200,566 B1 | 4/2007 | Moore et al. | |
| 7,308,254 B1 | 12/2007 | Rissanen | |
| 7,319,976 B1 * | 1/2008 | Peckover .............. | 705/14.36 |
| 7,343,317 B2 | 3/2008 | Jokinen et al. | |
| 7,630,921 B2 | 12/2009 | Deas et al. | |
| 2002/0062276 A1 | 5/2002 | Krueger et al. | |
| 2002/0133545 A1 * | 9/2002 | Fano et al. ............. | 709/203 |
| 2002/0160761 A1 | 10/2002 | Wolfe | |
| 2003/0055726 A1 | 3/2003 | Sohya et al. | |
| 2005/0187818 A1 * | 8/2005 | Zito et al. ............. | 705/14 |
| 2005/0198525 A1 * | 9/2005 | Trossen et al. .......... | 713/200 |
| 2006/0064346 A1 | 3/2006 | Steenstra et al. | |
| 2006/0190336 A1 | 8/2006 | Pisaris-Henderson et al. | |
| 2006/0190385 A1 | 8/2006 | Dresden | |
| 2006/0241859 A1 | 10/2006 | Kimchi et al. | |
| 2006/0247971 A1 | 11/2006 | Dresden et al. | |
| 2007/0050248 A1 | 3/2007 | Huang et al. | |
| 2007/0073585 A1 | 3/2007 | Apple et al. | |
| 2007/0121844 A1 | 5/2007 | Altberg et al. | |
| 2007/0162336 A1 | 7/2007 | Haque | |
| 2007/0174258 A1 | 7/2007 | Jones et al. | |
| 2007/0192182 A1 | 8/2007 | Monaco et al. | |
| 2007/0192294 A1 | 8/2007 | Ramer et al. | |
| 2007/0198442 A1 | 8/2007 | Horn | |

(Continued)

OTHER PUBLICATIONS

"JumpTXT Auction", retrieved on May 16, 2008 at <<http://www.impactmobile.com/reverse_auction.php>>, Impact Mobile Inc., 2007, pp. 1-2.

(Continued)

*Primary Examiner* — Justin Rider
(74) *Attorney, Agent, or Firm* — Lee & Hayes, PLLC

(57) ABSTRACT

A software and/or hardware facility for inferring user context and delivering advertisements, such as coupons, using natural language and/or sentiment analysis is disclosed. The facility may infer context information based on a user's emotional state, attitude, needs, or intent from the user's interaction with or through a mobile device. The facility may then determine whether it is appropriate to deliver an advertisement to the user and select an advertisement for delivery. The facility may also determine an appropriate expiration time and/or discount amount for the advertisement.

20 Claims, 4 Drawing Sheets

U.S. PATENT DOCUMENTS

| | | | |
|---|---|---|---|
| 2007/0250383 | A1 | 10/2007 | Tollinger et al. |
| 2007/0288312 | A1 | 12/2007 | Wang |
| 2008/0005074 | A1 | 1/2008 | Flake et al. |
| 2008/0040229 | A1 | 2/2008 | Gholston |
| 2008/0115163 | A1* | 5/2008 | Gilboa et al. .................... 725/34 |
| 2008/0249969 | A1* | 10/2008 | Tsui et al. ........................ 706/46 |
| 2009/0132353 | A1 | 5/2009 | Maggenti et al. |
| 2009/0198608 | A1 | 8/2009 | Jain et al. |
| 2009/0222343 | A1 | 9/2009 | Greene et al. |
| 2009/0319436 | A1 | 12/2009 | Andra et al. |
| 2010/0042403 | A1 | 2/2010 | Chandrasekar et al. |
| 2010/0042421 | A1 | 2/2010 | Bai et al. |
| 2010/0042469 | A1 | 2/2010 | Chandrasekar et al. |
| 2010/0324982 | A1 | 12/2010 | Marolli |

OTHER PUBLICATIONS

Kwon, Shin, Kim, "Context-aware multi-agent approach to pervasive negotiation support systems", retrieved on May 14, 2008 at <<http://www.sciencedirect.com/science?_ob=Mlmg&_imagekey=B6V03-4H8830S-4-W&_cdi=5635&_user=3765386&_orig=search&_coverDate=08%2F31%2F2006&_sk=999689997&view=c&wchp=dGLbVlb-zSkWW&md5=5d0ed2e804056c373c078ac2d1caffaf&ie=/sdarticle.pdf>>, Elsevier, Expert Systems with Applications, vol. 31, 2006, pp. 275-285.

"Mobile Marketing Sweepstakes and Promotions Guide", retrieved on May 14, 2008 at <<http://www.mmaglobal.com/mobilepromotions.pdf>>, Mobile Marketing Association, Jul. 2007 pp. 1-9.

Office Action for U.S. Appl. No. 12/193,652, mailed on Aug. 8, 2011, Tian Bai, "Context Based Advertisement Bidding Mechanism".

Siau, Lim, Shen, "Mobile Commerce: Current States and Future Trends", retrieved on May 14, 2008 at <<https://www.idea-group.com/downloads/excerpts/2003/159140052X.pdf>> Idea Group Inc., Chapter 1, 2003, pp. 1-18.

Xu, Teo, "Privacy Considerations in Location-Based Advertising", retrieved on May 14, 2008 at <<http://www.springerlink.com/content/l3370490661176u3/fulltext.pdf>>, Springer Boston, Designing Ubiquitous Information Environments: Socio-Technical Issues and Challenges, Part 2: Individual Consequences, vol. 185, 2005, pp. 71-90.

Gonzalez-Castano, Garcia-Reinoso, "Survivable Bluetooth Location Networks", retrieved on May 20, 2008 at <<http://www.it.uc3m.es/~jgr/publicaciones/03-fjcastanho-survivable.pdf>>, IEEE Proceedings of International Conference on Communications (ICC), vol. 2, 2003, pp. 1014-1018.

Hristova, O'Hare, "Ad-me: Wireless Advertising Adapted to the User Location, Device and Emotions", retrieved on May 20, 1008 at <<http://ieeexplore.ieee.org/iel5/8934/28293/01265673.pdf?tp=&isnumber=&arnumber=1265673>>, IEEE Computer Society, Proceedings of Conference on System Sciences (HICSS), vol. 9, 2004, pp. 1-10.

"TechWatch: Location Based Advertising", retrieved on May 21, 2008 at <<http://www.location.net.in/magazine/2007/july-august/24.htm>>, 2007, pp. 1-3.

* cited by examiner

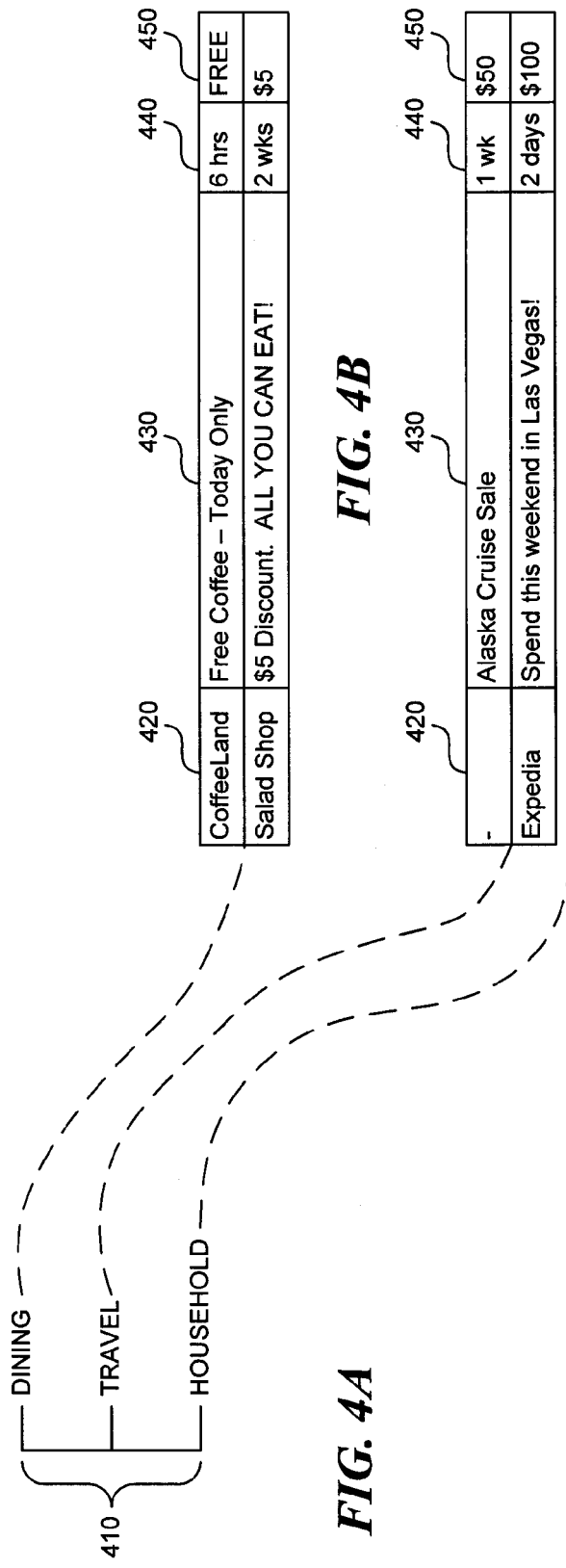

CONTEXT BASED ONLINE ADVERTISING

BACKGROUND

The increasing popularity of electronic communications is changing the way advertisers communicate with their audiences. In particular, advertising emphasis is shifting from traditional advertisements (e.g., print, television, billboard, etc.) to online advertising. Online advertising presents opportunities for targeting advertisements to receptive audiences and may result in increased acceptance of advertisements, higher clickthrough rates, and increased sales. Targeted advertisements may also result in increased revenue for advertisers and/or advertisement service providers (ASPs).

Likewise, mobile communications services such as wireless telephony, wireless data services, and wireless email are being increasingly used for both business and personal purposes. Mobile communications services now provide real-time or near real-time delivery of electronic communications and network access over large geographical areas. The increasing popularity of mobile communications services presents additional advertising opportunities.

SUMMARY

A software and/or hardware facility for inferring user context and delivering advertisements, such as coupons, using natural language and/or sentiment analysis is disclosed. The facility may infer context information based on a user's emotional state, attitude, needs, or intent from the user's interaction with or through a mobile device. The facility may then determine whether it is appropriate to deliver an advertisement to the user and select an advertisement for delivery. The facility may also determine an appropriate expiration time and/or discount amount for the advertisement.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A-4D illustrate examples of advertisements that may be managed.

DETAILED DESCRIPTION

A software and/or hardware facility for inferring user context and delivering advertisements, such as coupons, using natural language and/or sentiment analysis is disclosed. The facility may infer context information based on a user's emotional state, attitude, needs, or intent from the user's interaction with or through a mobile device. The facility may then determine whether it is appropriate to deliver an advertisement to the user and select an advertisement for delivery. The facility may also determine an appropriate expiration time and/or discount amount for the advertisement.

The facility may perform real-time, back-end, and/or adaptive analysis to infer context information. For example, adaptive analysis may include building and updating a model of a user's behavior and/or refining the selection of advertisements for delivery to the user. This may include increasing the relevance, targeting, likelihood of usefulness, and/or impact of delivered advertisements. The facility may be employed, for example, for targeting advertisements as well as for gauging, estimating, and/or predicting demand for products/services. Such demand may be utilized for adjusting staffing levels, increasing efficiency through just-in-time production, and/or the like.

The facility may also be employed to increase advertisement service providers (ASPs) and/or advertiser revenue by enabling ASPs to target advertisements to likely interested parties while decreasing the number of advertisements provided to likely uninterested parties. This may enable ASPs to provide, for example, spatio-temporal relevant advertisements to users predisposed to being interested in the advertisements. These users may be more likely to open the advertisement, read the advertisement, interact with the advertisement, make a purchase based on the advertisement, and/or the like, if the advertisement is relevant to their present or future location or situation. Accordingly, advertisements targeted in this manner may be more effective, and advertisers may be willing to pay increased advertising fees for them.

Figure 1:
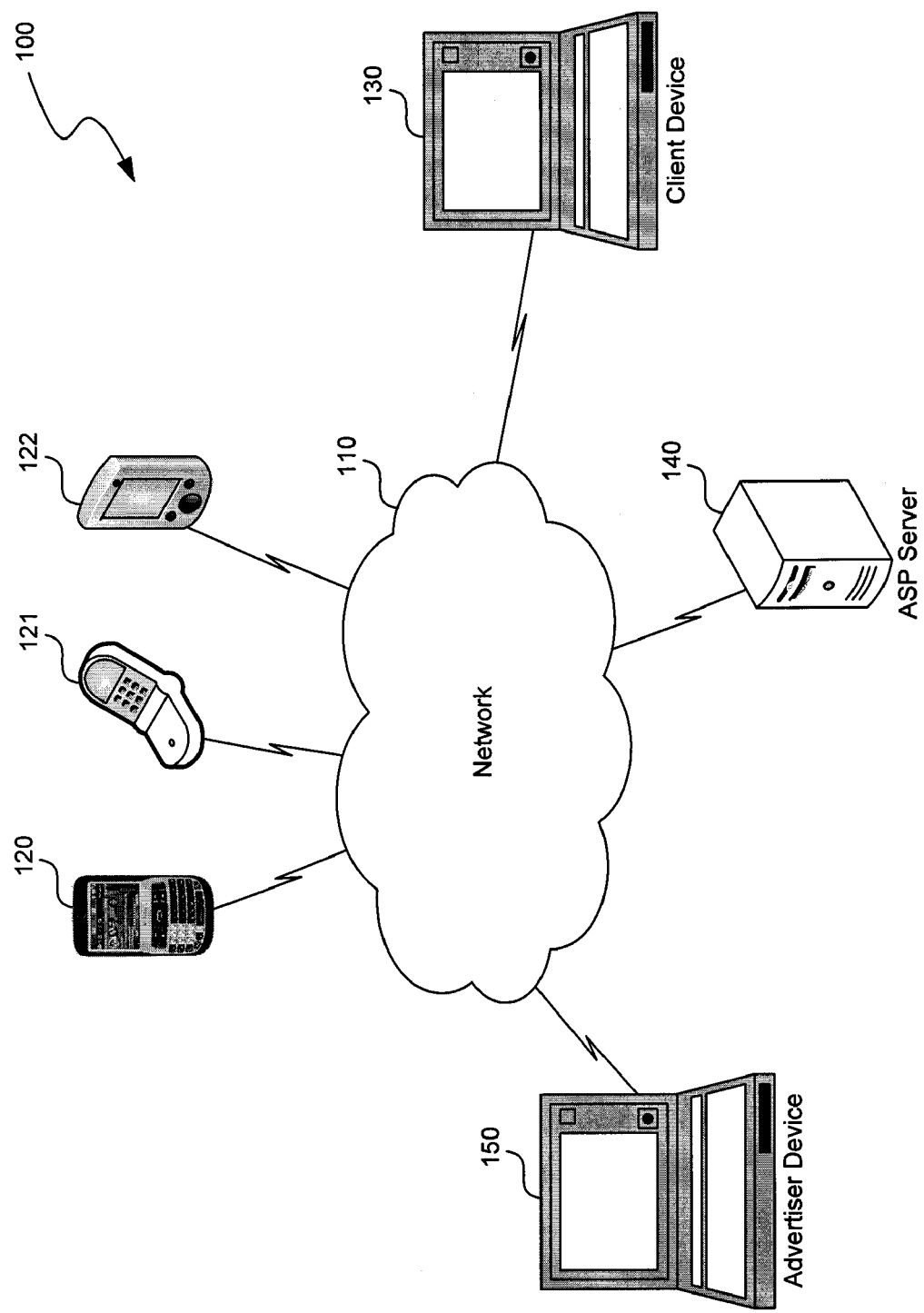
FIG. 1 illustrates a suitable environment for practicing aspects of the invention.

FIG. 1 illustrates a suitable environment in which aspects of the invention may be practiced. However, various modifications, such as the inclusion of additional devices, consolidation and/or deletion of various devices, and the shifting of functionality from one device to another, may be made without deviating from the invention. Environment 100 includes network 110, mobile devices 120-122, client device 130, ASP server 140, and advertiser device 150.

Network 110 is configured to interconnect various computing devices such as mobile devices 120-122, client device 130, ASP server 140, and advertiser device 150 to each other and to other resources. In addition, network 110 may include any number of wired and/or wireless networks, including the Internet, intranets, local area networks (LANs), metropolitan area networks (MANs), wide area networks (WANs), personal area networks (PANs), direct connections, and/or the like. Additional computing devices such as routers, network switches, hubs, modems, firewalls, gateways, Radio Network Controllers (RNCs), proxy servers, access points, base stations, and/or the like may be employed to facilitate communications.

Further, the various computing devices may be interconnected with T1 connections, T3 connections, OC3 connections, frame relay connections, Asynchronous Transfer Mode (ATM) connections, microwave connections, Ethernet connections, token-ring connections, Digital Subscriber Line (DSL) connections, and/or the like. In addition, network 110 may also utilize any wireless standard and/or protocol. These include, for example, Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Universal Mobile Telecommunications System (UMTS), Advanced Mobile Phone System (AMPS), Worldwide Interoperability for Microwave Access (WiMAX), Wireless Fidelity (WiFi), and/or the like.

Mobile devices 120-122 may include virtually any portable computing devices capable of receiving and sending messages over a network, such as network 110. Such devices include portable devices such as cellular telephones, display pagers, radio frequency (RF) devices, infrared (IR) devices, Personal Digital Assistants (PDAs), handheld computers, laptop computers, wearable computers, tablet computers, integrated devices combining two or more of the preceding devices, and/or the like. As such, mobile devices 120-122 range widely in terms of capabilities and features. For example, a cellular telephone may have a numeric keypad and the capability to display only a few lines of text. However, other cellular telephones (e.g., smart phones) may have a touch-sensitive screen, a stylus, and a relatively high-resolution display.

Mobile devices 120-122 may typically include a processing unit, volatile memory and/or nonvolatile memory, a power supply, one or more network interfaces, an audio interface, a display, a keypad or keyboard, a Global Positioning System (GPS) receiver and/or other location determination device, and other input and/or output interfaces. Also, the various components of mobile devices 120-122 may be interconnected via a bus.

The volatile and nonvolatile memories generally include computer storage media for storing information such as computer readable instructions, data structures, program modules, or other data. Some examples of information that may be stored include basic input/output systems (BIOS), operating systems, and applications. In addition, the memories may be employed to store operational data, content, contexts, and/or the like.

The memories may also store one or more client applications that are configured to receive, forward, and/or provide content, such as advertisements, from and/or to another computing device. Content may also be displayed and/or stored on mobile devices 120-122. The content may include advertisements contained within short message service (SMS) messages, multimedia message service (MMS) messages, instant messaging (IM) messages, enhanced message service (EMS) messages, and/or any advertisements or other content directed toward a user of mobile devices 120-122, such as audio data, multimedia data, photographs, video data, still images, text, graphics, animation files, voice messages, and text messages. The memories may also store one or more client applications that are configured to provide advertisement targeting information to other computing devices and/or to enable a user to respond to an advertisement (e.g., redeem a coupon, interact with an advertisement, reject an advertisement, etc.).

Mobile devices 120-122 may also provide identifiers to other computing devices. These identifiers may include identification of a type, capability, and/or name of each particular mobile device. In one embodiment, mobile devices 120-122 may uniquely identify themselves and/or identify a group association through any of a variety of mechanisms, including a phone number, a Mobile Identification Number (MIN), an electronic serial number (ESN), a Media Access Control (MAC) address, a personal identification number (PIN), an RF signature, and/or other identifier.

Client device 130 may include virtually any computing device capable of communicating over a network. Typically, client device 130 is a computing device such as a personal computer (PC), multiprocessor system, microprocessor-based or programmable consumer electronic device, and/or the like. In addition, client device 130 may be a television, digital video recorder, media center device, set-top box, other interactive television device, and/or the like. Also, client device 130 may store and/or execute client applications with the same or similar functionality as those stored on the memories of mobile devices 120-122. For example, client device 130 may store one or more client applications that are configured to provide advertisement targeting information to other computing devices and/or to enable a user to respond to an advertisement. In certain instances, advertisements may be delivered to a mobile device user at client device 130 instead of on a mobile device.

ASP server 140 may include any computing device capable of connecting to network 110 to provide advertisements to users of mobile devices 120-122 and/or client device 130. ASP server 140 may also be configured to manage online advertising. Devices that may operate as ASP server 140 include personal computers, desktop computers, multiprocessor systems, microprocessor-based or programmable consumer electronic devices, servers, and/or the like. Likewise, ASP server 140 may include a single computing device; the functionality of ASP server 140 may be distributed across multiple computing devices; or ASP server 140 may be integrated into another device such as an SMS gateway, an advertisement server, and/or the like.

Advertiser device 150 may include virtually any computing device capable of communicating over a network. Typically, advertiser device 150 is a computing device such as a personal computer, multiprocessor system, microprocessor-based or programmable consumer electronic device, and/or the like. Also, advertiser device 150 may be utilized by an advertiser to provide advertisements and/or other information to ASP server 140 and/or mobile devices 120-122 and/or to interact with a user following advertisement responses (e.g., to complete a sale, to register a user, to provide information, etc.). Also, advertiser device 150 may be configured to operate as a merchant platform (e.g., an online merchant web server, point-of-sale cash register or terminal, network-enabled vending machine, inventory management system, telephone sales system, etc.). In addition, advertiser device 150 may also be employed to provide information corresponding to advertisements, such as targeting information, advertising budget, advertising campaign characteristics, advertiser information, and/or the like to ASP server 140.

Additional details regarding mobile devices 120-122, client device 130, ASP server 140, advertiser device 150, and the functionalities thereof are discussed below.

Figure 2:
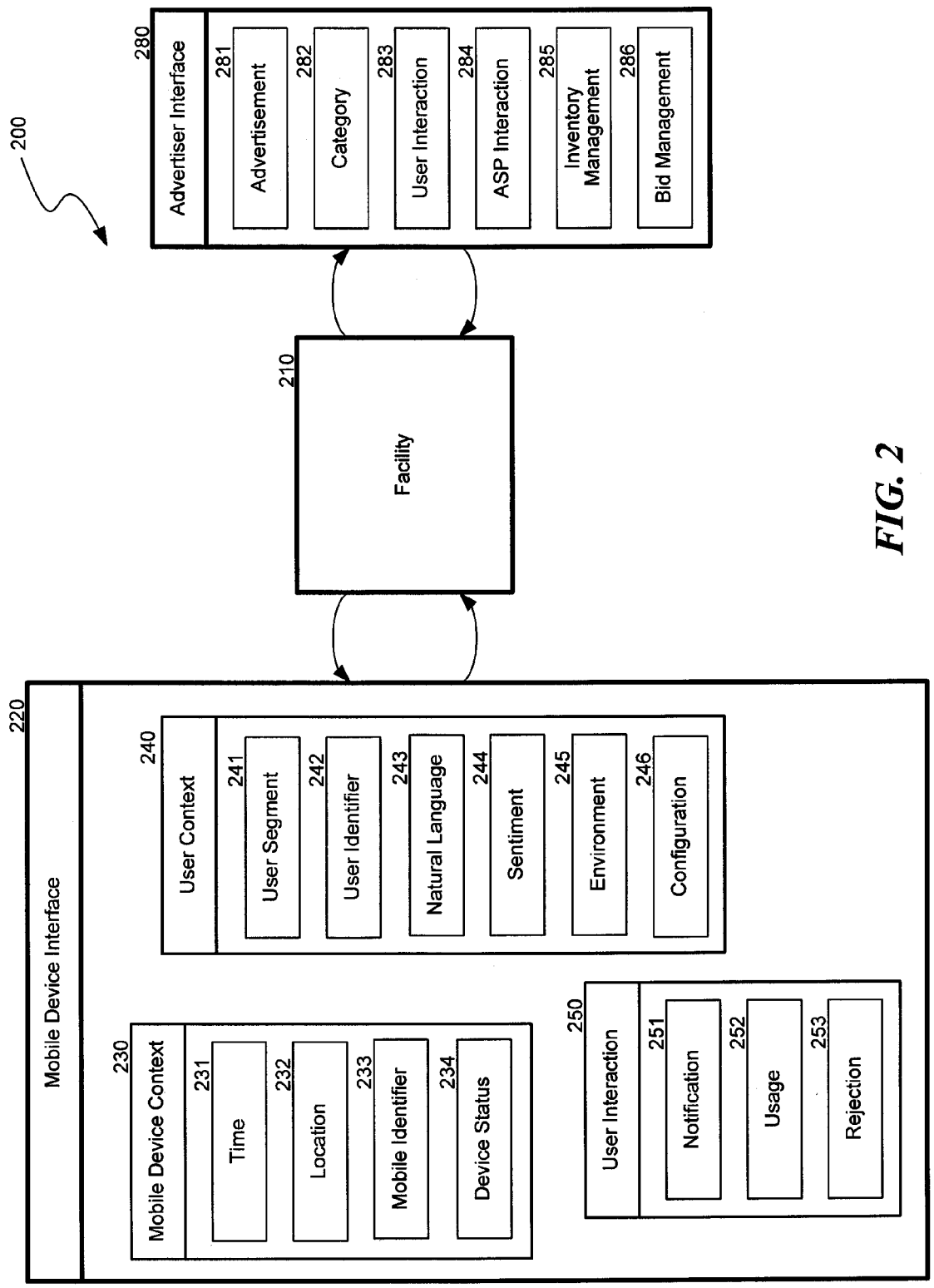
FIG. 2 illustrates a system for managing online advertising.

FIG. 2 illustrates online advertisement management system 200. As illustrated, system 200 includes facility 210, configured to receive inputs from multiple sources. The input sources may include mobile device interface 220 and advertiser interface 280. For clarity, system 200 and the functionalities thereof are described below as being performed by particular elements of environment 100 of FIG. 1. However, system 200 and the functionalities thereof may also be, for example, performed by or on other processors, elements, or devices whether or not such processors, elements, or devices are described herein.

Facility 210 may include a software and/or hardware facility for selecting advertisements for delivery to a user. For example, facility 210 may provide advertisements, such as coupons, to a mobile device user and enable the user to redeem the coupon.

Facility 210 may be implemented on any device. For example, facility 210 may be implemented on ASP server 140 and configured to receive inputs from mobile devices 120-122, client device 130, and/or advertiser device 150. However, facility 210 may also be implemented on and/or configured to receive input from any other suitable device. Likewise, the illustrated input sources are provided merely to illustrate some of the many possible input sources for such a facility. In other systems, other, different, fewer, and/or additional inputs may also be suitably employed.

Mobile device interface 220 may be provided to enable facility 210 to receive input from, and to communicate with, a mobile device. As illustrated, mobile device interface 220 includes mobile device context component 230, user context component 240, and user interaction component 250. In one example, mobile device interface 220 may be implemented on mobile devices 120-122 or client device 130. However, mobile device interface 220 may also be implemented on ASP server 140, advertiser device 150, and/or any other suitable device.

Mobile device interface 220 may employ either "push" or "pull" technologies to communicate with facility 210. For example, mobile device interface 220 may push context information to facility 210 on a continuous, periodic, or nonperiodic basis. Likewise, facility 210 may push advertisements to mobile device interface 220 based on received context information, and/or mobile device interface 220 may request, with or without context information, an advertisement, such as a coupon. In one example, a user may request a certain category of coupon (e.g., a dining coupon) from facility 210 via mobile device interface 220.

Mobile device context component 230 may be configured to provide any characteristics of a mobile device useful for targeting advertisements. As shown, mobile device context component 230 includes time module 231, location module 232, mobile identifier module 233, and device status module 234. However, mobile device context component 230 may include other modules.

Time module 231 may be employed to determine the current time and/or to measure durations of time. Time module 231 may include a clock, a timer, or a component to determine time from a broadcast time signal, a GPS signal, or any other time source. For example, time information may be employed by itself or in conjunction with other information to determine whether message delivery is currently appropriate (e.g., during daytime hours, while the user is not in a business meeting, etc.).

Location module 232 may be employed, for example, to determine the location of mobile device 120. The location of mobile device 120 may be determined by GPS, triangulation from broadcast tower signals and/or WiFi access point signals, manual entry by a user, schedule information, or any other location determination technique. This location information may be employed to provide geographically relevant advertisements, such as coupons, notifications, and/or offers. In addition, location information may further include speed and/or directional information relating to the mobile device. For example, speed and/or directional information may be employed to determine whether message delivery is currently appropriate and/or to provide geographically relevant advertising at a predicted destination and/or along a predicted route.

Mobile identifier module 233 may be employed to provide any useful mobile identifier to facility 210. For example, mobile identifiers may include device identifiers discussed above with respect to FIG. 1.

Device status module 234 may also be employed to provide device status information to facility 210. In one example, device status information includes a status of mobile device 120, such as whether mobile device 120 is currently employed for processing a voice telephone call, Internet browsing, processing email, playing music or video, and/or the like. Likewise, device status information may also include whether the mobile device is in a wireless communications service area, what the signal strength of a wireless communications signal is, whether peripheral devices (e.g., data storage devices, input/output devices, etc.) are connected, and/or the like.

User context component 240 may be configured to provide real-time, near real-time, and/or non-real-time user context characteristics to facility 210 that may be useful for targeting advertisements and/or selectively providing advertisements that are relevant to, for example, a user's mood, environment, or tasks. As shown, user context component 240 includes user segment module 241, user identifier module 242, natural language module 243, sentiment module 244, environment module 245, and configuration module 246.

User segment module 241 may be provided to identify characteristics of a user and/or group of users. For example, user segment module 241 may be employed to identify a group of users that share any one or more characteristics. Such characteristics may include geographic characteristics (e.g., location, population density (urban, semi-urban, rural), climate, etc.); demographic characteristics (e.g., age, gender, family size, education, income, occupation, socioeconomic status, religion, ethnicity, language, etc.); and/or behavioral characteristics (e.g., product usage rate, brand loyalty, readiness to buy, income status, etc.).

Any population of individuals may be divided into two or more segments by facility 210, such that the characteristics of each group association may provide information that is useful to target advertisements to users in that particular segment. These characteristics may also be determined through information received from a user, received from a third party, and/or inferred through a user's use of a mobile device. Although illustrated as within mobile device interface 220, user segment module 241 may also be integrated within facility 210.

User identifier module 242 may provide any useful user identifier to facility 210. For example, user identifiers may include usernames or other identifiers corresponding to the user of a mobile device. Facility 210 may also employ a user identifier if a mobile device user uses multiple mobile devices or if multiple users share a single mobile device.

Natural language module 243 and sentiment module 244 are respectively configured to provide natural language and sentiment information to facility 210. As one example, natural language and sentiment information may be based on a user's interaction with or through, for example, mobile device 120, may include textual, speech, and physiological information, and may be extracted from text messages, mobile browser queries, voice messages, telephonic discussions, notes, and/or any other information available to mobile device 120.

In one example, natural language information may be analyzed to determine the subject matter of the mobile device user's interaction with mobile device 120. Likewise, sentiment information may be analyzed to determine the user's emotional state, attitude, needs, or intent. For example, a mood, stress level, workload, and/or the like of the user may be inferred based on analyzing sentiment information. In addition, natural language and/or sentiment information may be analyzed to infer user context and/or user intent.

Natural language and/or sentiment analysis may employ any suitable analysis algorithms, methods, procedures, and/or the like. For example, natural language processing algorithms, voice recognition algorithms, pattern matching algorithms, computational linguistics algorithms, text mining algorithms, semantic analysis algorithms, vector analysis algorithms, and/or the like may be employed to analyze natural language and/or sentiment information. Custom and/or situational-specific vocabularies, libraries, models, and/or the like may also be employed.

Natural language and/or sentiment information may be extracted by mobile device 120 for on-board analysis and/or analysis at client device 130 and/or ASP server 140. However, natural language and/or sentiment information may be extracted at any other suitable computing device, such as ASP server 140, a wireless communications service base station, and/or the like. For example, natural language and/or sentiment information may be extracted by a wireless communications service base station in communication with mobile device 120.

User context module 240 may also include environment module 245 to ascertain or receive environmental information. For example, environmental information may include ambient temperature, body temperature, heart rate, humidity, pressure, current weather, traffic conditions, motion and/or orientation of mobile device 120, proximity to other mobile devices, and/or the like. Mobile device 120 may include various sensors to sense these and other examples of environmental information. However, certain examples of environmental information may be sensed at or by a server and/or provided by a third party. For example, proximity to other mobile devices may be determined at a communications service provider server, and current weather information may be provided by a third-party weather service.

Configuration module 246 may provide configuration information to facility 210. The configuration information may include a user's configurable preferences, configuration settings, configuration data, and/or schedule information. Some examples of suitable configuration information include the hours during which a user is willing to receive advertisements, the user's dietary preferences, the user's typical and/or anticipated travel plans, the user's calendar information and/or other schedule information, and/or the like. Also, calendar and schedule information may include information regarding the user's business meetings, personal meetings, events, task lists, and/or the like.

Configuration module 246 may also be included in and/or provide advertisement targeting information to facility 210 as further discussed in the concurrently filed U.S. Patent Application entitled "Context Based Advertisement Filtration" by E. Chang et al., having Ser. No. 12/193,681, the entirety of which is hereby incorporated by reference.

Additional preference information may be determined by observing text that a user has entered, past searches that the user has performed, bookmarks that have been saved by the user, messages the user may have sent or received, or other indications of subject matter of interest to the user. For example, mobile device 120 may include a record of the user's pattern of use of certain words, phrases, URLs, etc. As another example, mobile device 120 or ASP server 140 may include a record of purchases made by the user. As yet another example, mobile device 120 may include a record of the user's entertainment media, such as available audio and video media titles that are stored on or accessible via mobile device 120.

User interaction component 250 may also be provided to enable facility 210 to receive input from, and to communicate with, a user. As illustrated, user interaction component 250 includes notification module 251, usage module 252, and rejection module 253. In one example, user interaction component 250 may be implemented on mobile devices 120-122 or client device 130. However, it may also be implemented on ASP server 140, advertiser device 150, and/or any other suitable device.

Facility 210 may employ information received from user interaction component 250 to continuously and/or periodically improve facility 210 by accounting for a user's previous interactions with facility 210. These interactions may be analyzed to define user preferences, identify instances of previous message miscategorization, and improve/refine the accuracy of a message processing algorithm and/or a model of user behavior.

Notification module 251 may be configured to notify a user of an incoming advertisement. For example, notification module 251 may include an email client application, an SMS client application, a really simple syndication (RSS) client application, and/or the like. Notification module 251 may also be selectively configured to notify a user of incoming messages based on the user's context as further discussed in the concurrently filed U.S. Patent Application entitled "Context Based Advertisement Filtration" as incorporated by reference above.

Usage module 252 may provide usage data indicative of a user's interaction with advertisements. For example, usage data may include whether the user viewed an advertisement, requested further information, made a purchase, saved a message for later viewing, and/or the like.

Rejection module 253 may provide information regarding a user's rejection of an advertisement. For example, rejection module 253 may be employed by a user to indicate that an advertisement is unwanted, irrelevant, and/or the like. Rejection module 253 may also be configured to infer a user's response to an advertisement based on either passive or active actions. For example, rejection module 253 may be configured to infer a rejection of an advertisement based on whether the advertisement is deleted without being viewed, is viewed for a short duration, is ignored, and/or the like.

Facility 210 may receive input from, and communicate with, an advertiser via advertiser interface 280. As illustrated, advertiser interface 280 includes advertisement module 281, category module 282, user interaction module 283, ASP interaction module 284, inventory management module 285, and bid management module 286. In one example, advertiser interface 280 may be implemented on advertiser device 150. However, it may also be implemented on mobile devices 120-122, client device 130, ASP server 140, and/or any other suitable device.

Advertisement module 281 may be configured to provide advertisements and other corresponding information to facility 210. Advertisements may include virtually any information that an advertiser presents to an audience in any format or through any medium. Nonlimiting examples of suitable advertisements include coupons, textual advertisements, notifications of upcoming events, notifications of promotions, and/or the like. Also, advertisements may be either commercial or noncommercial in nature. For example, advertisements may be included with and/or intended for electronic delivery via email, SMS messages, MMS messages, and/or the like. However, other delivery methods may also be suitably employed. Advertisement module 281 may also be configured to provide corresponding information to facility 210. Corresponding information may include targeting information, budget information, advertising campaign characteristics, and/or the like.

Category module 282 may be provided to categorize received advertisements by any suitable characteristics, such as the value of the offer (e.g., dollar amount of discount, percentage amount of discount, status as free, lack of discount, etc.), the type of merchandise offered (e.g., food, clothes, electronics, events, etc.), the type of content (e.g., video advertisement, text advertisement, coupon, etc.), the timing of the offer, user-defined categories, and/or the like. Although illustrated as within advertiser interface 280, category module 282 may also be integrated within facility 210.

User interaction module 283 may be configured to enable interaction between an advertiser and users who receive advertisements. For example, advertiser interface 280 may be configured to provide additional information regarding a product and/or service, to conduct transactions with users, to track user responses to advertisements, to collect information regarding users, and/or the like. In one example, user interaction module 283 includes an advertiser's point-of-sale device configured to track redemption of coupons provided in advertisements. However, other devices may also suitably function as user interaction module 283.

ASP interaction module 284 may be configured to enable interaction between an advertiser and an ASP. For example, ASP interaction module 284 may enable communication of advertising budget information, advertisement effectiveness information, advertisement response information, and/or the like, between ASP server 140 and advertiser device 150. In one system, ASP interaction module 284 is configured to provide real-time communications between an ASP and an advertiser. However, in other systems, ASP interaction module 284 may provide delayed communications, batched communications, periodic communications, and/or the like. In one example, facility 210 may employ the information received from ASP interaction module 284 to improve/refine the bidding mechanism of system 200.

Inventory management module 285 may be configured to manage and/or provide inventory information. Likewise, inventory management module 285 may also be configured to receive advertising information (e.g., number of advertisements provided to users, historical redemption rates, expected redemption rate, etc.). For example, inventory management module 285 may be employed to adjust bid prices based on inventory levels and/or to adjust inventory based on anticipated demands.

Bid management module 286 may be configured to provide bids to facility 210, for example, to indicate an advertiser's willingness to pay for delivery of an advertisement, redemption of a coupon, and/or the like. For example, bid management module 286 may calculate a bid as a function of the category of the advertisement, the time at which the advertisement is to be delivered, the location of the user when the advertisement is delivered, a user segment of the user, and/or the like.

Bid management module 286 may also be employed to receive information relating to the effectiveness of the advertiser's or other advertisers' advertisements. This information may include either generic information and/or information specific to an advertiser, advertisement category, particular advertisement, and/or the like. Bid management module 286 may also employ such information to determine bid prices, modify advertisements, cancel advertisements, and/or the like.

In operation, information from these and other modules may be employed to target advertisements for user delivery through inferred and other context information. Based on this context information, the facility may determine whether it is appropriate to deliver an advertisement to the user, select an advertisement for delivery, and optionally determine an appropriate expiration time and/or discount amount for the advertisement. For example, facility 210 may operate as a matchmaking system to match advertisements with users who are likely to respond positively to the advertisements. In addition, information from these and other modules may be employed for gauging, estimating, and/or predicting demand for products/services (e.g., based on the number of advertisements delivered; based on actual, predicted, and/or historical effectiveness of advertisements; based on the timing of advertisement delivery, etc.).

In one example, facility 210 may additionally deliver advertisements based on advertisement effectiveness. Advertisement effectiveness may be determined based on estimations and/or user feedback to previously delivered advertisements. The effectiveness may also be determined for a particular user, user segment, particular advertisement, category of advertisements, and/or the like. Advertisement effectiveness may also be based on redemption rates; response rates; discount amount; community-based feedback; the popularity of the advertiser, product, or service; and/or the like.

In one system, a feedback loop may be employed to determine advertisement effectiveness. For example, advertisement identifiers (e.g., unique or nonunique serial numbers, bar codes, coupon codes, tracking numbers, telephone numbers, email addresses, user identifiers, etc.) may be used to determine advertisement effectiveness through users' responses.

As examples of advertisement targeting that may be provided by facility 210, an automobile dealer's advertisement may be delivered to users who have placed telephone calls to automobile dealers, have searched for automobile-related information, have included automobile-related terms in speech transmitted through their mobile devices, and/or the like. Likewise, if facility 210 has information that another user purchases coffee each afternoon at 3:00 p.m., facility 210 may send a geographically relevant coffee advertisement (with or without a coupon) to the user at, for example, 2:50 p.m. However, facility 210 may be employed in any other number of ways.

The above examples are provided to illustrate the operation of facility 210. However, these examples merely illustrate some of the many possible inputs for facility 210 and some of the many ways in which facility 210 may utilize its various inputs.

Figure 3:
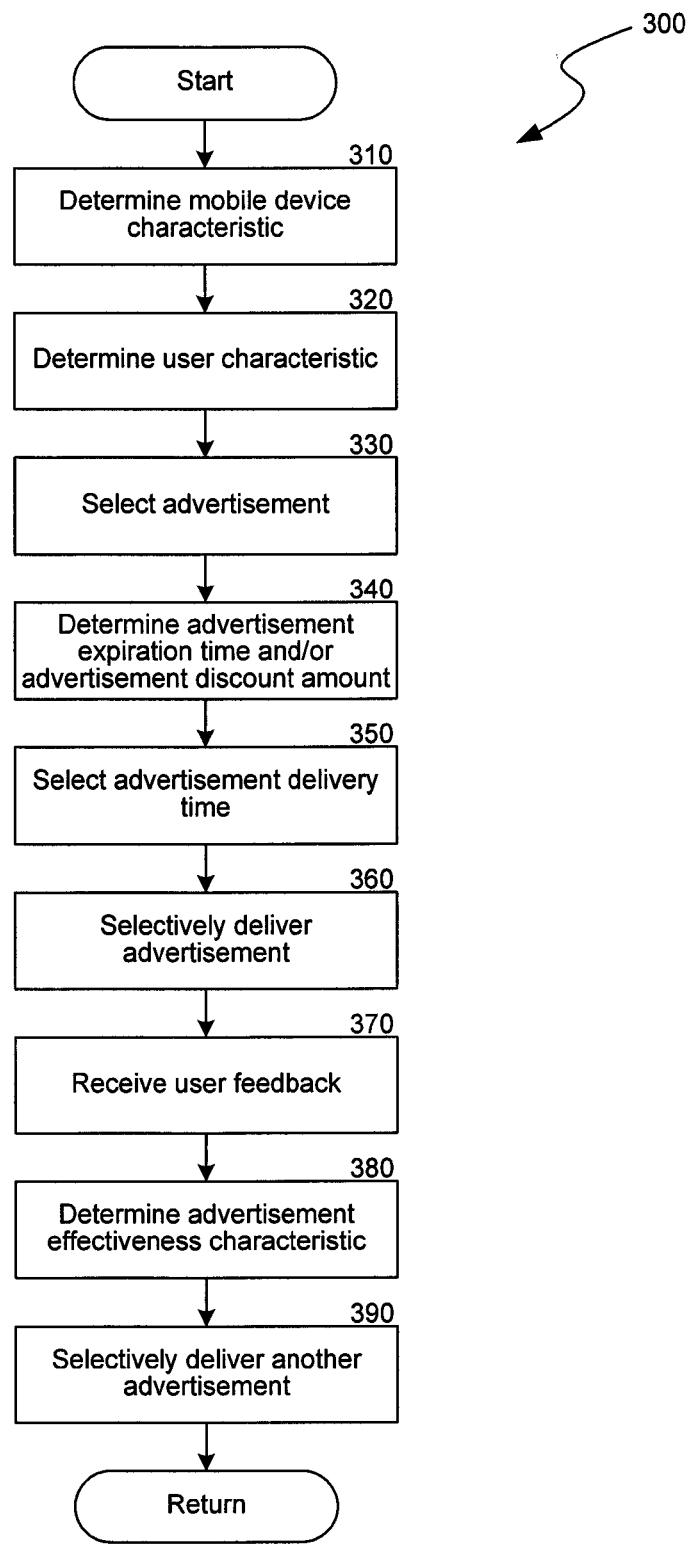
FIG. 3 is a logical flow diagram of a process for managing online advertising.

FIG. 3 illustrates process 300 for managing online advertising. Process 300 may be implemented in software, in hardware, or in a combination of hardware and software. As such, the operations illustrated as blocks in FIG. 3 may represent computer-executable instructions which, when executed, direct a system in managing online advertising. For clarity, process 300 is described below as being performed by particular elements of environment 100 of FIG. 1 and system 200 of FIG. 2. However, process 300 may also be performed by other processors, by other elements, or in other systems, whether or not such processors, elements, or systems are described herein. Likewise, process 300 may be a real-time, near real-time, or non-real-time process.

At block 310, facility 210 determines a mobile device characteristic, for example, based on mobile device context provided by mobile device context component 230. In one example, the mobile device characteristic is a spatio-temporal characteristic such as a time, location, and/or speed of the mobile device. However, the mobile device characteristic may include characteristics from mobile identifier module 233, device status module 234, and/or from any other suitable source. From block 310, processing flows to block 320.

At block 320, facility 210 determines a user characteristic. The determined user characteristic may be based on a user context that includes natural language information and/or sentiment information extracted from, or otherwise based on, user interactions with the mobile device. In one example, the natural language information and/or sentiment information is extracted from, or otherwise based on, user speech data. However, the user characteristic may also be based on any other characteristic from user context component 240 and/or from any other suitable source. For example, the user characteristic may be based on a user's demographic group, identity, specific user characteristics, specific mobile device, and/or the like. From block 320, processing flows to block 330.

At block 330, facility 210 selects an advertisement. For example, the advertisement may be selected based on correspondence between the targeting information for the selected advertisement and the mobile device and user characteristics. As discussed below, facility 210 may also select an advertisement based on advertisement effectiveness, previous interaction with the user, and/or the like. From block 330, processing flows to block 340.

At block 340, facility 210 determines an advertisement expiration time and/or advertisement discount amount. For example, these advertisement characteristics may be determined based on any suitable mobile device and/or user characteristics. From block 340, processing flows to block 350.

At block 350, facility 210 selects a time at which it delivers the selected advertisement. In one example, facility 210 operates as a real-time system and delivers advertisements immediately upon selection of the advertisement. For example, facility 210 may continuously, periodically, and/or nonperiodically monitor mobile device and/or user characteristics to deliver advertisements if the mobile device and/or user characteristics indicate that the characteristics are appropriate for delivery of the advertisement. However, other examples of facility 210 may select a time at which a user is expected to desire, need, and/or be predisposed to have a positive response to the selected advertisement. For example, the selected time may be based on previous user interaction with facility 210, user schedule information, and/or the like. From block 350, processing flows to block 360.

At block 360, facility 210 selectively delivers the selected advertisement. This selective delivery may be based on the mobile device characteristics and the user characteristics at the delivery time, as discussed above. From block 360, processing flows to block 370.

At block 370, facility 210 receives user feedback. For example, this user feedback may correspond to the advertisement selectively delivered at block 360. In one example, the user feedback is provided to facility 210 from user interaction component 250. From block 370, processing flows to block 380.

At block 380, facility 210 determines the advertisement effectiveness characteristic, for example, based on user feedback. Facility 210 may determine advertisement effectiveness based on any suitable factors, including those discussed above. From block 380, processing flows to block 390.

At block 390, facility 210 selectively delivers another advertisement, for example, based on the determined advertisement effectiveness. This may include delivering a same, similar, and/or competing advertisement to the user at a different time; building and updating a model of user behavior; refining the selection of advertisements for delivery to the user; and/or the like. From block 390, processing returns to other actions. In other examples, from block 390, processing may instead flow to block 310, 320, 330, 340, 350, 360, 370, or 380 to iteratively and selectively deliver any number of additional advertisements.

Those skilled in the art will appreciate that the blocks shown in FIG. 3 may be altered in a variety of ways. For example, the order of blocks may be rearranged, substeps may be performed in parallel, shown blocks may be omitted, or other blocks may be included, etc.

FIGS. 4A-4D illustrate example advertisements that may be delivered to users by, for example, facility 210. As shown, FIG. 4A illustrates example advertisement categories. FIG. 4B illustrates exemplary dining advertisements. FIG. 4C illustrates exemplary travel advertisements. Finally, FIG. 4D illustrates exemplary household advertisements. While FIGS. 4A-4D illustrate certain example categories and advertisements, other categories and advertisements may be included. For example, other categories may be included for automotive, housing, and entertainment advertisements.

Each of FIGS. 4B-4D also illustrates sender field 420, subject field 430, expiration field 440, and discount field 450 for the various example advertisements. However, other advertisements may include any number of other fields. For example, a message text field, various flag fields, a received time field, an event time field, and/or the like may also be included.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples, and alternative implementations may employ differing values or ranges. Those skilled in the art will also appreciate that the actual implementation of a database may take a variety of forms, and the term "database" is used herein in the generic sense to refer to any data structure that allows data to be stored and accessed.

We claim:

1. A method for managing online advertising, comprising:
   determining a mobile device characteristic based on a mobile device context of a mobile device;
   determining a user characteristic based at least in part on a user context that includes natural language information based on a user interaction with a mobile device and sentiment information based on the user interaction with the mobile device, the sentiment information including a mood, emotional state or attitude of a user of the mobile device;
   determining an advertisement based at least in part on the determined mobile device characteristic and the determined user characteristic;
   determining a time, based at least in part on the mood, the emotional state or the attitude, at which the user is expected to desire, need, and/or be predisposed to have a positive response to the advertisement; and
   selectively delivering the advertisement at the time to the user of the mobile device.

2. The method of claim 1, further comprising:
   extracting the natural language information from the user interaction with the mobile device; and
   extracting the sentiment information from the user interaction with the mobile device.

3. The method of claim 1, wherein determining the user characteristic includes:
   receiving user speech data; and
   extracting at least one of the natural language information or the sentiment information from the received user speech data.

4. The method of claim 1, wherein determining the advertisement includes selecting the advertisement from multiple advertisements based on the determined mobile device characteristic and the determined user characteristic.

5. The method of claim 1, wherein selectively delivering the advertisement includes:
   determining at least one of an advertisement expiration time or an advertisement discount amount based on the determined mobile device characteristic and the determined user characteristic.

6. The method of claim 1, wherein determining the mobile device characteristic further includes:
   determining ancillary information including at least one of a location of the mobile device, a speed of the mobile device, or a time at the mobile device, and wherein the mobile device context is further based on the determined ancillary information.

7. The method of claim 1, wherein determining the user characteristic further includes:
   determining environmental information including at least one of ambient temperature information, body temperature information, heart rate information, humidity information, pressure information, weather information, traffic condition information, or information relating to proximity of the mobile device to other mobile devices, and wherein the user context is further based on the determined environmental information.

8. The method of claim 1, wherein selectively delivering the advertisement is further based on an advertisement effectiveness characteristic.

9. The method of claim 8, wherein the advertisement effectiveness characteristic includes at least one of a redemption rate, response rate, discount amount, community-based feedback, advertiser popularity, product popularity, or service popularity of the selectively delivered advertisement.

10. The method of claim 8, further comprising:
receiving user feedback including a response from a user of the mobile device corresponding to the selectively delivered advertisement;
determining the advertisement effectiveness characteristic based on the received user feedback; and
selectively delivering another advertisement based on the determined advertisement effectiveness.

11. The method of claim 1, further comprising:
estimating a demand for at least one of a product or service based on the selectively delivered advertisement.

12. A processor-readable storage memory containing instructions for executing operations for managing online advertising, the operations comprising:
determining a mobile device characteristic based on a mobile device context of a mobile device, including:
determining ancillary information including at least one of a location of the mobile device, a speed of the mobile device, or a time at the mobile device;
determining a user characteristic based on a user context that includes at least one of natural language information based on a user interaction with a mobile device or sentiment information based at least in part on the user interaction with the mobile device, the user characteristic including a mood, emotional state or attitude of a user of the mobile device;
selecting an advertisement from multiple advertisements based on the determined mobile device characteristic and the determined user characteristic;
determining a time, based at least in part on the mood, the emotional state or the attitude, at which the user is expected to desire, need, and/or be predisposed to have a positive response to the advertisement;
selectively delivering the advertisement at the time to the mobile device;
receiving user feedback including a response from a user of the mobile device corresponding to the selectively delivered advertisement;
determining the advertisement effectiveness characteristic based on the received user feedback; and
selectively delivering another advertisement based on the determined advertisement effectiveness.

13. The processor-readable storage memory of claim 12, wherein determining the user characteristic includes:
receiving user speech data; and
extracting at least one of the natural language information or the sentiment information from the received user speech data.

14. The processor-readable storage memory of claim 12, wherein the method further comprises:
estimating a demand for at least one of a product or service based on the selectively delivered advertisement.

15. The processor-readable storage memory of claim 12, wherein determining the user characteristics further includes:
determining environmental information including at least one of ambient temperature information, body temperature information, heart rate information, humidity information, pressure information, weather information, traffic condition information, or information relating to proximity of the mobile device to other mobile devices, and wherein the user context is further based on the determined environmental information.

16. The processor-readable storage memory of claim 12, wherein the method further comprises determining at least one of an advertisement expiration time or an advertisement discount amount based on the determined mobile device characteristic and the determined user characteristic.

17. A computing system configured to manage online advertising, comprising:
a memory;
a first module configured, when executed in the memory, to determine a mobile device characteristic based at least in part on a mobile device context of a mobile device;
a second module configured, when executed in the memory, to determine a user characteristic of a user of the mobile device based at least in part on a user context that includes at least one of natural language information based at least in part on a user interaction with a mobile device or sentiment information based on the user interaction with the mobile device, the natural language information including at least one of speech transmitted or speech received by the mobile device during a telephonic conversation; and
a third module configured, when executed in the memory, to selectively deliver an advertisement to the user at the mobile device and to the user at a client device that differs from the mobile device based at least in part on the determined mobile device characteristic and the determined user characteristic.

18. The computing system of claim 17, wherein the second module is further configured, when executed in the memory, to:
receive user speech data; and
extract at least one of the natural language information or the sentiment information from the received user speech data.

19. The computing system of claim 17, wherein the third module is further configured, when executed in the memory, to:
select the advertisement from multiple advertisements based on the determined mobile device characteristic and the determined user characteristic;
determine at least one of an advertisement expiration time or an advertisement discount amount based on the determined mobile device characteristic and the determined user characteristic; and
select a time at which to deliver the selected advertisement.

20. The computing system of claim 17, further comprising:
a fourth module configured, when executed in the memory, to receive user feedback corresponding to the selectively delivered advertisement;
a fifth module configured, when executed in the memory, to determine the advertisement effectiveness characteristic based on the received user feedback; and
a sixth module configured, when executed in the memory, to selectively deliver another advertisement based on the determined advertisement effectiveness.

* * * * *